United States Patent
Bono et al.

(10) Patent No.: US 9,330,103 B1
(45) Date of Patent: May 3, 2016

(54) PRESERVING FILE HANDLES WHEN MOVING FILE SYSTEM OPERATION BETWEEN STORAGE PROCESSORS

(71) Applicant: EMC Corporation, Hopkinton, MA (US)

(72) Inventors: Jean-Pierre Bono, Westborough, MA (US); Yuanyang Wu, Shanghai (CN); Frederic Corniquet, Le Pecq (FR); Walter C. Forrester, Berkeley Heights, NJ (US); Jeffrey A. Monin, North Caldwell, NJ (US)

(73) Assignee: EMC Corporation, Hopkinton, MA (US)

( * ) Notice: Subject to any disclaimer, the term of this patent is extended or adjusted under 35 U.S.C. 154(b) by 193 days.

(21) Appl. No.: 14/229,323

(22) Filed: Mar. 28, 2014

(51) Int. Cl.
*G06F 17/00* (2006.01)
*G06F 17/30* (2006.01)

(52) U.S. Cl.
CPC .... *G06F 17/30079* (2013.01); *G06F 17/30123* (2013.01)

(58) Field of Classification Search
None
See application file for complete search history.

(56) References Cited

U.S. PATENT DOCUMENTS

| | | | |
|---|---|---|---|
| 2002/0133491 A1* | 9/2002 | Sim | G06F 17/30067 |
| 2003/0220985 A1* | 11/2003 | Kawamoto | G06F 3/0611 709/219 |
| 2008/0288506 A1* | 11/2008 | Brown | G06F 11/1435 |
| 2014/0325170 A1* | 10/2014 | Aswathanarayana | G06F 9/45558 711/162 |
| 2014/0325640 A1* | 10/2014 | Aggarwal | G06F 21/31 726/18 |
| 2015/0066847 A1* | 3/2015 | Beard | G06F 17/30079 707/613 |
| 2015/0066852 A1* | 3/2015 | Beard | G06F 17/30212 707/625 |
| 2015/0067759 A1* | 3/2015 | Beard | G06F 17/30079 726/1 |
| 2015/0261558 A1* | 9/2015 | Robinson | G06F 9/45558 718/1 |

OTHER PUBLICATIONS

Traeger et al, "NFS File Handle Security", 2013.*

* cited by examiner

*Primary Examiner* — Hung Le
(74) *Attorney, Agent, or Firm* — BainwoodHuang (57) ABSTRACT

A technique for managing access to files by different data storage systems includes a data storage system generating an E-FSID (export FSID) for a file system in addition to a conventional FSID and providing the E-FSID in file handles that the data storage system generates for providing clients with access to the file system. The E-FSID is shared between/among different data storage systems, with each data storage system including data for cross-referencing the E-FSID to a respective local FSID for the file system. Because the E-FSID for a file is the same across different data storage systems, file handles continue to work after failover, migration, and other transitions.

20 Claims, 5 Drawing Sheets

PRESERVING FILE HANDLES WHEN MOVING FILE SYSTEM OPERATION BETWEEN STORAGE PROCESSORS

BACKGROUND

Data storage systems are arrangements of hardware and software that may include multiple storage processors coupled to arrays of non-volatile storage devices. In typical operation, the storage processors service storage requests that arrive from users. The storage requests specify files or other data elements to be written, read, created, or deleted, for example. The storage processors run software that manages incoming storage requests and performs various data processing tasks to organize and secure user data stored on the non-volatile storage devices.

Data storage systems commonly store file systems that client machines can access for reading and/or writing over a network. Such data storage systems typically assign FSIDs (file system identifiers) to the file systems they host. The data storage systems may also provide file handles (e.g., NFS file handles) to client machines, to provide client machines with fast access to files in the file systems. A data storage system typically provides different file handles for accessing respective files in the various file systems it stores. A typical file handle includes an FSID, which identifies the file system in which a desired file can be found, a file identifier, such as an inode number of the file within the designated file system, and a generation count.

SUMMARY

Data storage systems conventionally assign FSIDs to file system sequentially, or according to some other scheme, e.g., as the data storage systems create the file systems. If a file system stored on a first data storage system is copied to a second data storage system, e.g., as part of a replication or migration operation, the second data storage system typically assigns a new FSID to the copy of the file system stored on the second data storage system.

Unfortunately, the FSID assigned to the copy of the file system by the second data storage system seldom matches the FSID assigned to the same file system by the first data storage system. As the FSIDs differ, any file handles generated by the first data storage system generally become ineffective for accessing copies of the same files from the second data storage system. Consequently, when client access to the file system is moved from the first data storage system to the second data storage system, e.g., in the event of a failover, migration, and so forth, the file handles assigned by the first data storage system do not generally work on the second data storage system and the client machines must remount the file system on the second data storage system and obtain new file handles. The file handles obtained from the second data storage system will then include the local FSID of the copy of the file system on the second data storage system. The need to remount the file system and obtain new file handles is disruptive to clients, which may run demanding applications that cannot tolerate substantial downtime.

In contrast with the conventional approach, an improved technique for managing access to files by different data storage systems includes a data storage system generating an E-FSID (export FSID) for a file system in addition to a conventional FSID and providing the E-FSID in file handles that the data storage system generates for providing clients with access to the file system. The E-FSID is shared between/among different data storage systems, with each data storage system including data for cross-referencing the E-FSID to a respective local FSID for the file system. Because the E-FSID for a file is the same across different data storage systems, file handles continue to work after failover, migration, and other transitions. When any data storage system receives a file handle from a client, the data storage system performs a lookup to map the E-FSID received in the file handle to a respective local FSID, and then uses the local FSID to locate the file in storage. File handles are therefore preserved after failover, migration, and other transition events. In addition, client machines are no longer required to remount the file system and disruption is avoided.

In some examples, data storage systems organize file systems in the context of VSPs (Virtualized Storage Processors), where each VSP includes multiple file systems and one or more network servers, such as an NFS (Network File System) server. Each VSP operates within a storage processor and has its own IP (Internet Protocol) address, thus enabling the VSP to appear over a network as if it were a physical storage processor. According to some embodiments hereof, the above-described use of E-FSIDs allows VSPs to be moved readily among different storage processors and data storage systems without invalidating previously established file handles for files stored in the VSPs' file systems. Thus, VSPs can be readily moved within or among data storage systems without disrupting client access or forcing file systems to be remounted.

Certain embodiments are directed to a method of managing access to files by different processors. The method includes providing, by a first set of processors, a file handle to a client, the file handle (i) identifying a file in a file system stored in a first storage location accessible by the first set of processors and (ii) including an E-FSID (export file system identifier) for identifying the file system from among multiple file systems. The method further includes copying the E-FSID to a second storage location accessible by a second set of processors, the second storage location storing a copy of the file system, the copy of the file system including a copy of the file. The method still further includes, in response to the second set of processors receiving a request from the client to perform an operation to read and/or write the file in the file system, the request including the file handle that specifies the E-FSID of the file system, the second set of processors completing the operation to read and/or write the copy of the file.

Other embodiments are directed to a system constructed and arranged to perform the method described above. Still other embodiments are directed to a computer program product. The computer program product includes one or more computer-readable media. The media store instructions which, when executed on a first set of processors and a second set of processors, cause the first set of processors and the second set of processors to perform the method described above. Some embodiments involve activity that is performed at a single location, while other embodiments involve activity that is distributed over a computerized environment (e.g., over a network).

BRIEF DESCRIPTION OF THE SEVERAL VIEWS OF THE DRAWINGS

The foregoing and other features and advantages will be apparent from the following description of particular embodiments of the invention, as illustrated in the accompanying drawings, in which like reference characters refer to the same parts throughout the different views. The drawings are not necessarily to scale, emphasis instead being placed upon illustrating the principles of various embodiments of the invention. In the accompanying drawings.

DETAILED DESCRIPTION OF THE INVENTION

Embodiments of the invention will now be described. It is understood that such embodiments are provided by way of example to illustrate various features and principles of the invention, and that the invention hereof is broader than the specific example embodiments disclosed.

An improved technique for managing access to files by different data storage systems includes a data storage system generating an E-FSID (export FSID) for a file system in addition to a conventional FSID and providing the E-FSID in file handles that the data storage system generates for providing clients with access to the file system. The E-FSID is shared between/among different data storage systems, with each data storage system including data for cross-referencing the E-FSID to a respective local FSID for the file system.

Figure 1:
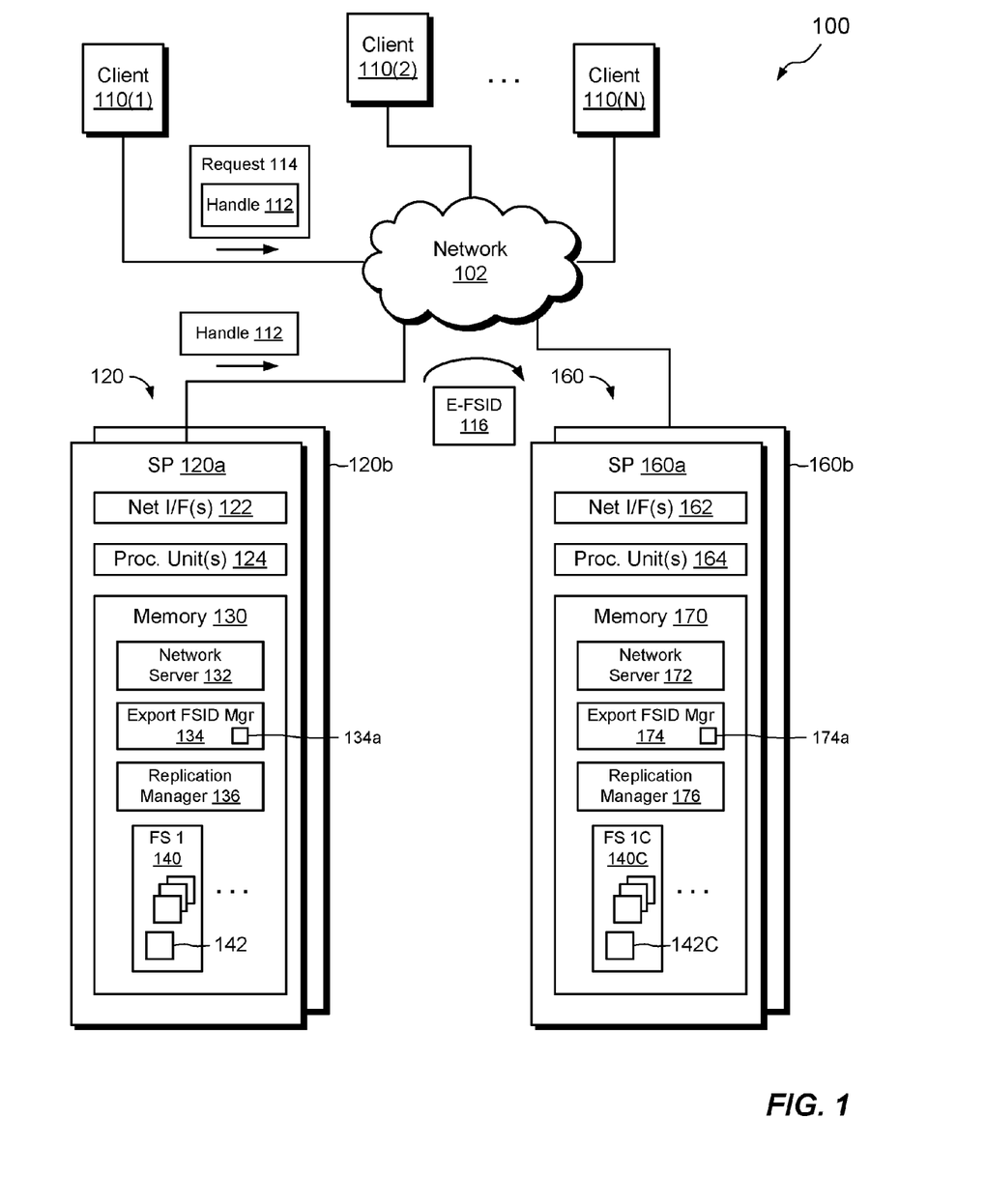
FIG. 1 is a block diagram of an example environment in which embodiments hereof can be practiced.

FIG. 1 shows an example environment 100 in which embodiments of the improved technique hereof can be practiced. Multiple client machines 110(1) through 110(N) connect to a first data storage system 120 and to a second data storage system 160 over a network 102. The first and second data storage systems 120 and 160 also connect to each other over the network 102. The network 102 is typically the Internet, but the network may be implemented using a WAN (Wide Area Network), a LAN (Local Area Network), a high-speed interconnect, such as InifiniBand, or any combination of the foregoing, for example. Although two data storage systems 120 and 160 are shown, it should be understood that the environment 100 may include any number of data storage systems.

It is seen from the example environment 100 that the data storage systems 120 and 160 are similarly configured. Each data storage system includes a set of processors, and each of the set of processors may be implemented as a storage processor. For example, the first data storage system 120 includes a set of processors 120a and 120b. Similarly, the second data storage system 160 includes a set of processors 160a and 160b. It is understood that each of the data storage systems 120 and 160 may include any number of storage processors, including only a single storage processor.

As shown in FIG. 1, the storage processor 120a in the first data storage system 120 includes one or more network interfaces 122, a set of processing units 124 (i.e., one or more processing cores, chips, and/or assemblies), and memory 130. Other storage processors in the first data storage system 104 (if there are any) may be configured in a similar manner.

The memory 130 includes both volatile memory (e.g., RAM) and non-volatile memory, such as one or more disk drives, solid state drives and the like. The set of processing units 124 and the memory 130 together form control circuitry, which is constructed and arranged to carry out various methods and functions as described herein. Also, the memory 130 includes a variety of software constructs realized in the form of executable instructions. When the executable instructions are run by the set of processing units 124, the set of processing units 124 are caused to carry out the operations of the software constructs. Although certain software constructs are specifically shown and described, it is understood that the memory 130 typically includes many other software constructs, which are not shown, such as an operating system and various applications, processes, and daemons. Also, although the software constructs are seen as being stored within the memory 130, which is shown as being enclosed within the storage processor 120a, it is understood that the memory 130 may extend outside the storage processor 120a to include external storage devices and/or arrays.

The memory 130 is seen to realize a network server 132 (e.g., an NFS server), an export FSID manager 134, and a replication manager 136. The export FSID manager 134 includes a database 134a that cross-references local FSIDs with corresponding E-FSIDs for file systems stored in the first data storage system 120. The memory 130 also realizes one or more file systems, such as FS 1 (140), which is seen to include a file 142, i.e., the file 142 is located within file system 140. Typically, the memory 130 may realize many file systems, each including many files, although only a single file system is shown for illustrative purposes.

In an example, the second data storage system 160 is configured similarly to the first data storage system 120. For example, network interfaces 162, a set of processing units 164, and memory 170 are constructed, arranged, and realized in a similar manner to the respective network interfaces 122, set of processing units 124, and memory 130 in the first data storage system 120. Also, the memory 170 in the second data storage system 160 realizes a network server 172 (e.g., an NFS server), an export FSID manager 174, and a replication manager 176, which are similar, respectively, to the network server 132, export FSID manager 134, and replication manager 136 in the first data storage system 120. The export FSID manager 174 includes a database 174a that cross-references local FSIDs with corresponding E-FSIDs for file systems stored in the second data storage system 160. It should be understood that storage local to or otherwise accessible by the first data storage system 120 may be regarded herein as a first storage location. Similarly, storage local to or otherwise accessible by the second data storage system 160 may be regarded herein as a second storage location.

In the example shown, the memory 170 in the second data storage system 160 stores a copy of the same file systems that are stored in the memory 130 of the first data storage system 120. For example, the memory 170 in the second data storage system 160 stores a copy 140C of FS 1 (140). The copy 140C of FS 1 includes a file 142C, which is a copy of the file 142. In an example, the copy 140C of FS 1 may be established by operation of the replication managers 136 and 176. For example, an administrator or other user or machine may establish a replication session for FS 1 using any number of replication techniques (e.g., synchronously and/or asynchronously). Replication of FS 1 may then proceed on a real-time, or nearly real-time basis, such that any changes in FS 1 (140) are reflected in FS 1C (140C). In other examples, the copy 140C of FS 1 may be established by direct copying, data federation techniques, or some other process. More information about replication suitable for use herein may be found in copending U.S. patent application Ser. No. 14/041,191, filed 30 Sep. 2013, the contents and teachings of which are hereby incorporated by reference in their entirety.

The first data storage system 120 and the second data storage system 160 are typically disposed at different locations, such as in different rooms, buildings, cities, etc., although this is not required. Alternatively, the data storage system 120 and the second data storage system 160 are disposed at different locations within the same room (e.g., in a data center) and may even be disposed as subsystems at respective locations within a larger system.

In example operation, any of client machines 110(1) to 110(N) may access file system FS 1 (140) from the first data storage system 120, while the second data storage system 160 may operate as a replica or back-up site which provides read-only or no access to the copy of FS 1 140C. When a client machine requests access to a file in FS 1, the network server 132 generates a file handle for that file. For example, in response to a request from client machine 110(1), the network server 132 generates a file handle 112 for file 142. The network server 132 does not generate the file handle 112 with the local FSID of FS 1, as would normally be done, however. Rather, the export FSID manager 134 generates an E-FSID (export FSID) 116 and provides the generated E-FSID 116 to the network server 132, which then packages the E-FSID 116, along with other identifying information for the file 142, into the file handle 112. The file handle 112 is then returned to client machine 110(1). The export FSID manager 134 may generate the E-FSID 116 on demand, as described, e.g., in response to a client machine requesting a file handle, although this is not required. For example, the export FSID manager 134 may generate the E-FSID 116 at the same time that the first data storage system creates the local FSID for FS 1. In an example, the export FSID manager 134 stores the generated E-FSID 116 in database 134a along with the corresponding local FSID for FS 1.

In an example, the export FSID manager 134 generates E-FSIDs as unique numbers. In some examples, each unique number is a globally unique identifier (GUID). In some examples, the GUID is provided as a randomly generated, 128-bit number. Generally, uniqueness of E-FSIDs is guaranteed simply because the probability of randomly generating the same 128-bit number twice, at the rate at which E-FSIDs are typically created, is infinitesimally small. If E-FSIDs are generated with small numbers, however, a process can be implemented to still ensure uniqueness among E-FSIDs. For example, an E-FSID server (not shown) could be provided for keeping track of E-FSIDs and dispensing unique E-FSIDs to different data storage systems. In any case, absolute uniqueness among E-FSIDs is not always required.

Once the client machine 110(1) has possession of the file handle 112, the client machine 110(1) can send a request 114 to the first data storage system 120 to perform a read and/or write operation on the file 142. The request 114 includes or is otherwise provided in connection with the file handle 112, which the client machine 110(1) has previously obtained. In response to receiving the request 114, the first data storage system 120, e.g., via the network server 132, unpacks the file handle 112 to obtain the E-FSID 116. The export FSID manager 134 then performs a lookup in the database 134a to obtain the local FSID corresponding to the E-FSID 116. The first data storage system 120 then completes the request 114 by performing the designated read and/or write operation on the file 142 using the local FSID. For example, the first data storage system 120 processes the request 114 using an IO stack that identifies the file system in which the file 142 is stored by the local FSID, and then effects the actual reading and/or writing of the file 142.

It is understood that any number of requests, like the request 114, may be received from any of the client machines 110(1) to 110(N), for reading and/or writing the file 142, other files of FS 1, or files of other file systems (not shown). Each such request includes a file handle that specifies the E-FSID of the file system that contains the file to which the request is directed.

To support a change in access control over FS 1 from the first data storage system 120 to the second data storage system 160, the first data storage system 120 sends the E-FSID 116 of FS 1 to the second data storage system 160. This may happen at any time prior to changing access control. The second data storage system 160 then stores the received E-FSID 116 in the database 174a. The database 174a stores the E-FSID 116 in connection with a local FSID of the copy of file system 1 (the file system 140C), which the second data storage system 160 may have generated when the file system 140C was created. It should be understood that the database 174a may store the E-FSID 116 as a "foreign E-FSID," i.e., one which was assigned by a data storage system other than the second data storage system 160. The database 174a may further store a "local E-FSID" of the file system 140C, which the export FSID manager 174 may have created for providing read-only access to the file system 140C, for example. It should be understood that all E-FSIDs for all file systems stored on the first data storage system 120 are generally copied to the second data storage system 160, in the manner described, so that the second data storage system 160 has possession of the same E-FSIDs that the first data storage system 120 has provided in file handles dispensed to clients.

At some point, it may become necessary or desirable to change access control of FS 1 from the first data storage system 120 to the second data storage system 160. In one example, it may be desirable to take the first data storage system 120 out of service for repairs or upgrades. In another example, it may be desirable to migrate FS 1 from the first data storage system 120 to the second data storage system 160, e.g., to promote better load sharing. In still other examples, it may be necessary to failover control of FS 1 from the first data storage system 120 to the second data storage system 160, e.g., in the event of a failure in the first data storage system 120. In such cases, the first data storage system 120 takes FS 1 offline (assuming it is not offline already, due to some failure) and the second data storage system 160 brings the file system 140C online. The second data storage system 160 typically brings the file system 140C online by internally mounting the file system 140C read/write. It should be understood that similar acts may be performed to change access control of other file systems (if any) originally hosted from the first data storage system 120 but replicated or otherwise copied to the second data storage system 160. In some examples, the replication managers 136 and/or 176 manage the procedures of bringing the file system 140 offline on the first data storage system 120 and bringing the copy of the file system 140C online on the second data storage system 160.

In response to access control of FS 1 having been changed to the second data storage system 160, the second data storage system 160 proceeds to interpret all file handles arriving from client machines 110(1) to 110(N) as foreign E-FSIDs. For example, when the second data storage system 160 receives a request like the request 114, including file handle 112, from client machine 110(1), the export FSID manager 174 performs a lookup into the database 174a to find the local FSID that corresponds to the foreign E-FSID received in the file handle 112. The second data storage system 160 then completes the request by performing the designated read and/or write operation on the file 142C using the local FSID within the second data storage system 160. For example, the second data storage system 160 processes the request 114 using an IO stack that identifies the file system in which the file 142C is stored by its local FSID. The IO stack then effects the actual reading and/or writing of the file 142C using the local FSID.

Although example operation has been described for changing access control over a file system from the first data storage system 120 to the second data storage system 160, it should be understood that similar activities may be performed in the reverse direction or in both directions. For example, each of the data storage systems 120 and 160 may act as a replica site for the other. The replication managers 136 and 176 may thus operate to coordinate migration, load sharing, and/or failover, by moving control of file systems between data storage systems, or even between different sets of processors within a single data storage system.

Figure 2:
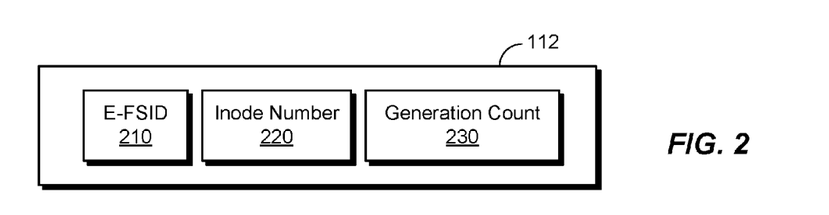
FIG. 2 is a diagram showing example constituents of a file handle that can be used in the environment of FIG. 1.

FIG. 2 shows an example arrangement of the file handle 112, which may be typical of file handles generated by the network servers 132 and 172. Here, the file handle 112 is seen to include an E-FSID 210, an inode number 220, and a generation count 230. As described, the E-FSID 210 provides a unique identifier for a file system and applies across different data storage systems. As indicated above, in some example the E-FSID is provided as a randomly generated, 128-bit number. The inode number 220 uniquely identifies a specific file within the identified file system. The generation count indicates the number of times the particular inode number has been recycled (e.g., to reflect files using the inode number being deleted and replaced with new files using the same inode number). Together, the E-FSID 210, inode number 220, and generation count 230 uniquely identify a particular file across different data storage systems. By contrast, conventional file handles only identify particular files within a particular data storage system.

Figure 3:
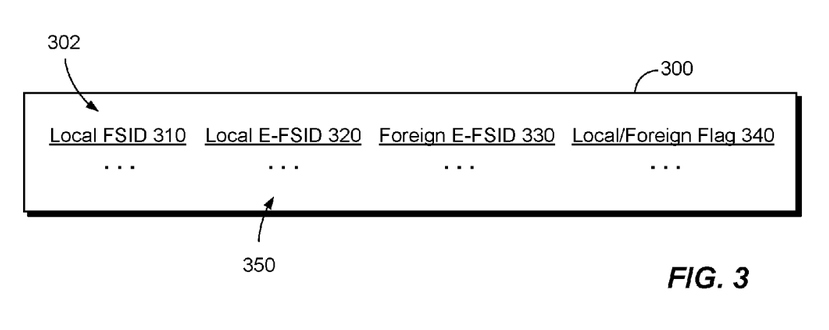
FIG. 3 is a diagram showing an example data structure for cross-referencing local FSIDs of file systems and/or snaps with corresponding locally generated E-FSIDs and with corresponding remotely generated foreign E-FSIDs, e.g., FSIDs generated by one or more remote data storage systems for one or more copies of the file system stored remotely.

FIG. 3 shows an example database 300, which is representative of the databases 134a and 174a found in the export FSID managers 134 and 174, respectively. Here, the database 300 is seen to include fields 302 and entries 350. The entries pertain to particular file systems and snaps thereof stored in the data storage system in which the database 300 is found. For example, entries in the database 134a include a separate entry for each file system and snap stored in the first data storage system 120, whereas entries in the database 174a include a separate entry for each file system and snap stored in the second data storage system 160. In an example, the fields include the following:

Local FSID 310. The FSID that the resident data storage system (i.e., the one on which the database 300 is found) has assigned to a file system or snap. For example, a "local FSID" stored in database 134a indicates the value of the FSID that the first data storage system 120 has assigned to the listed file system or snap. Likewise, a "local FSID" stored in database 174a indicates the value of the FSID that the second data storage system 160 has assigned to the listed file system or snap. Generally, data storage systems assign the local FSIDs (or simply, the "FSIDs") at the time the file systems or snaps are created.

Local E-FSID 320. The export FSID that the resident data storage system has generated for a file system or snap. The data storage system may have dispensed this local E-FSID to one or more client machines 110(1) to 110(N). For instance, the database 134a represents the E-FSID 116 as a local E-FSID because the E-FSID 116 was generated by the first data storage system 120 on which the database 134a is located.

Foreign E-FSID 330. The export FSID that the resident data storage system has received from another data storage system. For instance, the database 174a represents E-FSID 116 as a foreign E-FSID, as E-FSID 116 was generated by the first data storage system 120 but was stored in the database 174a of the second data storage system 160.

Local/Foreign Flag 340. The current E-FSID to be used when interpreting file handles received from clients in connection with the listed file system or snap. For example, the copy 140C of FS 1 (FIG. 1) may have been available for read-only access by clients of the second data storage system 160 prior to the above-described change in access control. As there is normally no expectation that clients require non-disruptive access to the file system 140C prior to the change, the local/foreign flag 340 for the file system 140C in the database 174a may be set to "local" to indicate that the local E-FSID is to be used in interpreting incoming file handles. However, once access control of FS 1 changes to the second data storage system 160, the local/foreign flag for file system 140C in the database 174a is changed to "foreign" to indicate that the foreign E-FSID is to be used when interpreting incoming file handles.

Those skilled in the art will realize that the database 300 may be implemented in a variety of ways and that the specific example shown is merely illustrative.

In some examples, it is not always necessary to distinguish local E-FSIDs from foreign E-FSIDs. In cases where E-FSIDs are generated as large, random numbers, the probability of collisions between local E-FSIDs and foreign E-FSIDs is near zero, so both can be recognized at the same time. For example, a first file handle may specify a file system by its local E-FSID. By performing a lookup in the database 300, the local FSID corresponding to the E-FSID received in the first handle can be found and any requested read or write operations can be completed. Likewise, a second file handle may specify the same file system by its foreign E-FSID. By performing a lookup in the database 300, the local FSID corresponding to the E-FSID received in the second handle can be found and any requested read or write operations can similarly be completed. Although security and data protection concerns may limit the feasibility of this use case, it is nevertheless possible to respond to file handles that include both local and foreign E-FSIDs and thus to preserve those file handles and prevent disruption to clients.

Further, although FIG. 3 suggests that there is only a single foreign E-FSID 330 for each file system or snap, in some cases there may be more. For example, a data storage system can operate as a replication site for numerous other data storage systems, or data storage systems can operate in a cluster. It may thus be possible for the same file system or snap to have multiple foreign E-FSIDs, corresponding to E-FSIDs generated on other, respective systems. The database 300 may thus be adapted for storing multiple foreign E-FSIDs for each entry.

Figure 4:
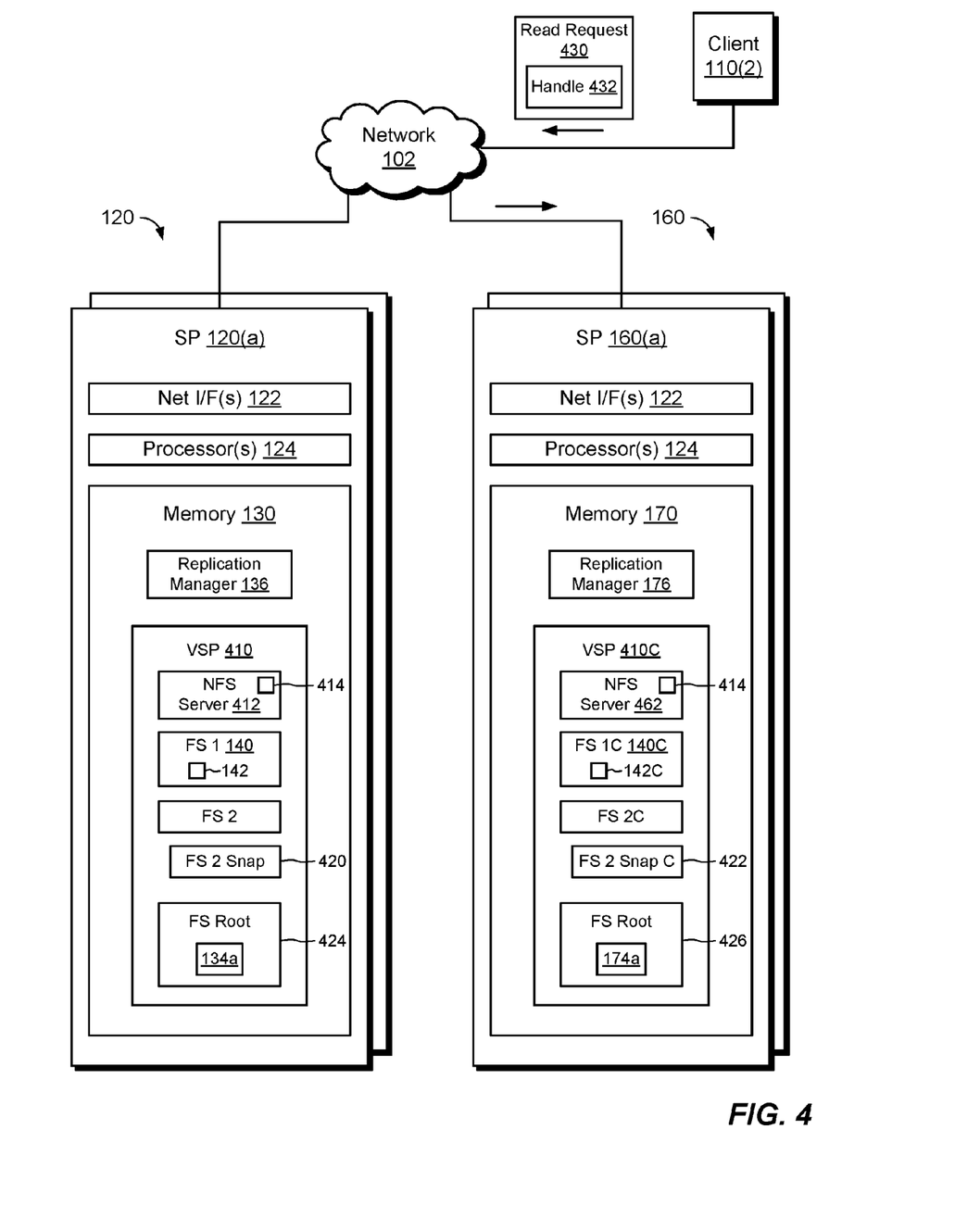
FIG. 4 is a block diagram showing constituents of FIG. 1 but with file systems and network servers provided in VSPs (Virtualized Storage Processors)

FIG. 4 shows the example environment 100 of FIG. 1 configured to support VSPs (virtualized storage processors). VSPs, also referred to as VDMs (virtual data movers), are software constructs run on physical storage processors. Each VSP groups together file systems, settings, and network servers. Each VSP has its own IP address, and clients may access VSPs similarly to the way clients access physical storage processors. Multiple VSPs can be run on a single storage processor, and VSPs can be moved between storage processors for load sharing, migration, and failover. Additional information about VSPs may be found in copending U.S. patent application Ser. No. 13/828,294, filed Mar. 14, 2013, the contents and teachings of which are hereby incorporated by reference in their entirety.

As shown in FIG. 4, the first data storage system 120 runs a VSP 410, which includes an NFS server 412 and various file systems. The file systems include the above-described FS 1 (140), as well as a file system FS 2 and a "root" file system, FS Root 424. The NFS server 412 has an IP address 414, which allows the VSP 410 to communicate with client machines 110(1) to 110(N) over the network 102 using an Internet protocol (e.g., TCP/IP). The file system 140 includes the file 142, as before. The VSP 410 also includes a snap 420 of FS 2. The snap 420 may be any type of snap, such as a point-in-time copy, an incremental difference, and so on. Although the export FSID manager 134 is not shown, the database 134a, or a similar structure, is included within the root file system 424.

As further shown in FIG. 4, the second data storage system 160 includes VSP 410C, which is a copy of VSP 410 and has the same IP address 414 as the VSP 410. VSP 410C includes copies, FS 1C, FS 2C, and FS 2 Snap C, of the respective objects stored in VSP 410. VSP 410C also includes a root file system 426. The root file system 426 includes the database 174a and is generally not a copy of the root file system 424 but is rather generated when the VSP 410C is created.

In an example, the VSP 410C is created on the second data storage system 160 as part of a replication process for replicating the VSP 410 from the first data storage system 120 to the second data storage system 160. The replication process includes copying each of a set of file systems in VSP 410 (e.g., all file systems except the root file system 424) to VSP 410C. For each file system copied, the replication process directs the second data storage system 160 to create a local FSID for the file system on the second data storage system. The created local FSID is generally different from the FSID created for the same file system by the first data storage system 120. The replication process also stores the foreign E-FSID of the file system in connection with the local FSID, e.g., in the database 174a. The foreign E-FSID in this case would be the E-FSID that the first data storage system 120 generated for the file system. In the case of FS 1, and referring briefly back to FIG. 1, this would mean storing the E-FSID 116 in connection with the local FSID for file system 140C.

In an example, the replication process treats snaps no differently from file systems. In some examples, prior to copying (e.g., replicating) a snap, the first data storage system 120 generates an E-FSID for the snap and copies the E-FSID for the snap to the second data storage system 160. The E-FSID for the snap is a local E-FSID on the first data storage system 120 but a foreign E-FSID on the second data storage system 160.

During replication, and taking snap 420 as an example, the replication process creates a copy 422 in the VSP 410C of the snap 420. As before, the replication process directs the second data storage system 160 to create a local FSID for the copy 422 of the snap. The replication process may further store, e.g., in the database 174a, the newly created, local FSID of the snap 422 in connection with the (here foreign) E-FSID of the snap 420 copied over from the first data storage system 120.

In some cases, it may be desirable for the second data storage system 160 to generate a local E-FSID for any copied file systems or snaps. For example, clients may wish to access copies of file systems and snaps in read-only mode, e.g., prior to any failover or other change in access control. Thus, in addition to storing foreign E-FSIDs in connection with each copied file system and snap, it may also be desirable to store local E-FSIDs.

For example, prior to changing access control from the VSP 410 to the copy VSP 410C, but after copying (e.g., replicating) the first file system 140 to the copy 140C, the client 110(2) may send a read request 430 specifying a read of the file 142C stored in the file system 140C in the VSP 410C. The read request 430 includes a file handle 432, which includes the local E-FSID of the file 142C on the second data storage system 160. The file handle 432 thus differs from the file handle 112 (FIG. 1), even though both point to the same file (or rather, to different generally identical copies thereof). The second data storage system 160, upon receiving the read request 430, performs a lookup in the database 174a to obtain the local FSID of the file 142C, and proceeds to process the read request 430 using the local FSID, in a manner similar to that described in connection with other examples above.

More information about VSP replication may be found in copending U.S. patent application Ser. No. 14/041,191, filed 30 Sep. 2013, the contents and teachings of which are hereby incorporated by reference in their entirety.

Figure 5:
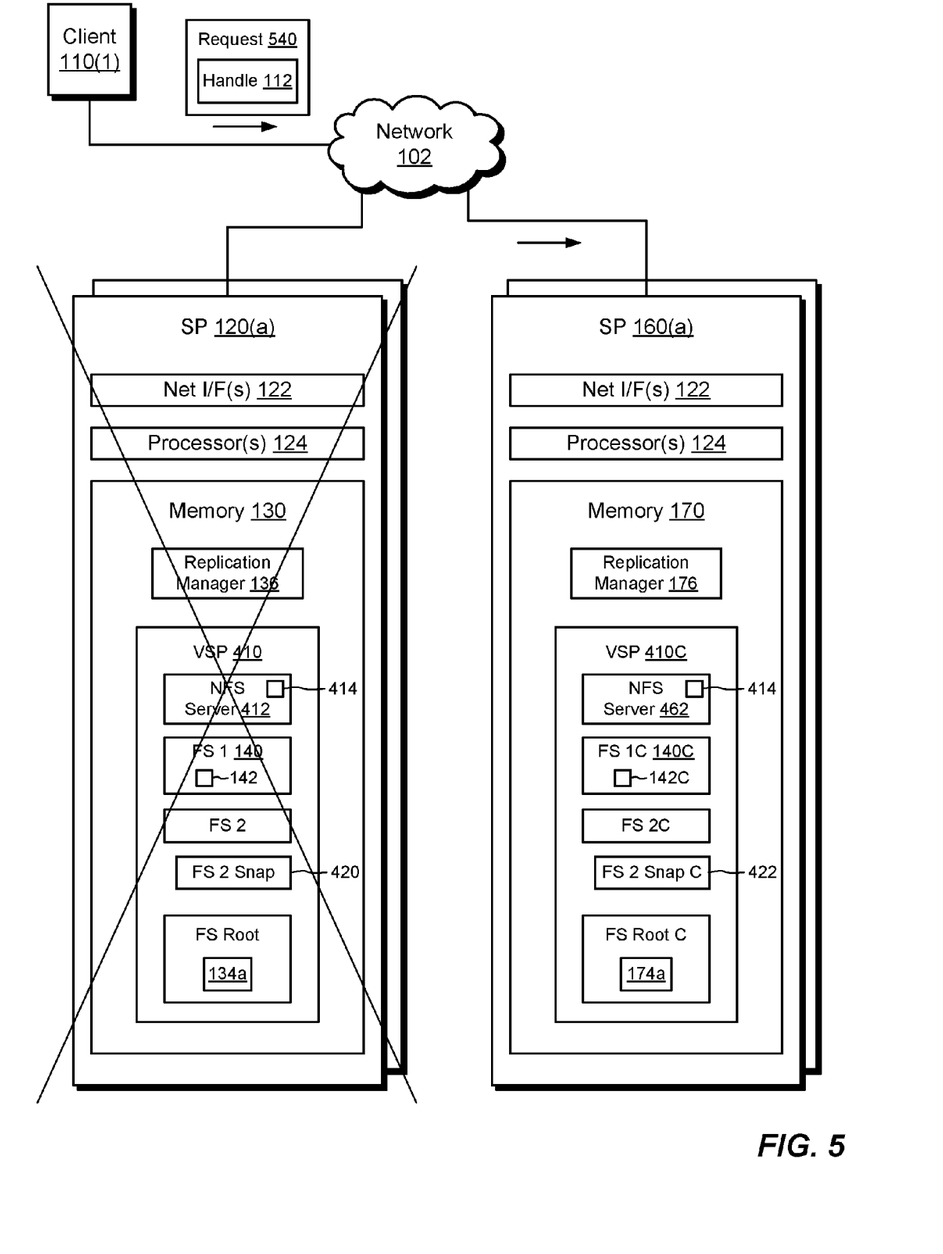
FIG. 5 is a block diagram showing certain constituents of FIG. 4 after a failover or other event has occurred at a first data storage system.

FIG. 5 shows an example arrangement similar to that of FIG. 4, except that, here, it is shown that the first data storage system 120 has been brought offline. For example, a failure event may have occurred among the processors 120a and/or 120b, a site failure may have occurred, e.g., due to a power outage, natural disaster, etc. Or the first data storage system 120 may simply have been brought offline for repairs or disabled for some other reason. In any case, the first data storage system 120 is no longer available to service client requests.

To avoid disrupting clients, it is desired to restore access with little or no delay from the second data storage system 160. To restore access, the second data storage system 160, e.g., acting under direction of the replication managers 136 and/or 176, or some other source, internally dismounts any file systems of VSP 410C previously mounted as read-only and remounts the file systems of VSP 410C as read/write. In response to remounting the file systems as read/write (or in response to some other event), the second data storage system 260 overrides any local E-FSIDs in use for accessing files in VSP 410C with the foreign E-FSIDs previously acquired from the first data storage system 120. In practice, this change may entail setting the Local/Foreign Flag 340 (FIG. 3) to "foreign" for each file system and snap entered in the database 174a in VSP 410C. Subsequently, incoming file handles are interpreted according to the foreign E-FSIDs, such that file handles that previously worked for accessing files of VSP 410 from the first data storage system 120 continue to work when accessed (via copies) from the second data storage system 160.

For example, the second data storage system 160 receives a request 540 to read and/or write data to the file 142 (FIG. 1), and provides the file handle 112 (FIG. 1) to identify the file. As the file handle 112 includes the E-FSID 116 of the file system FS 1, the second data storage system 160 recognizes the E-FSID 116 as the foreign E-FSID for file system 140C. The second data storage system 160 performs a lookup in the database 174a to obtain the local FSID of file system 140C, and proceeds to complete the operation specified in the request 540 using the local FSID.

Figure 6:
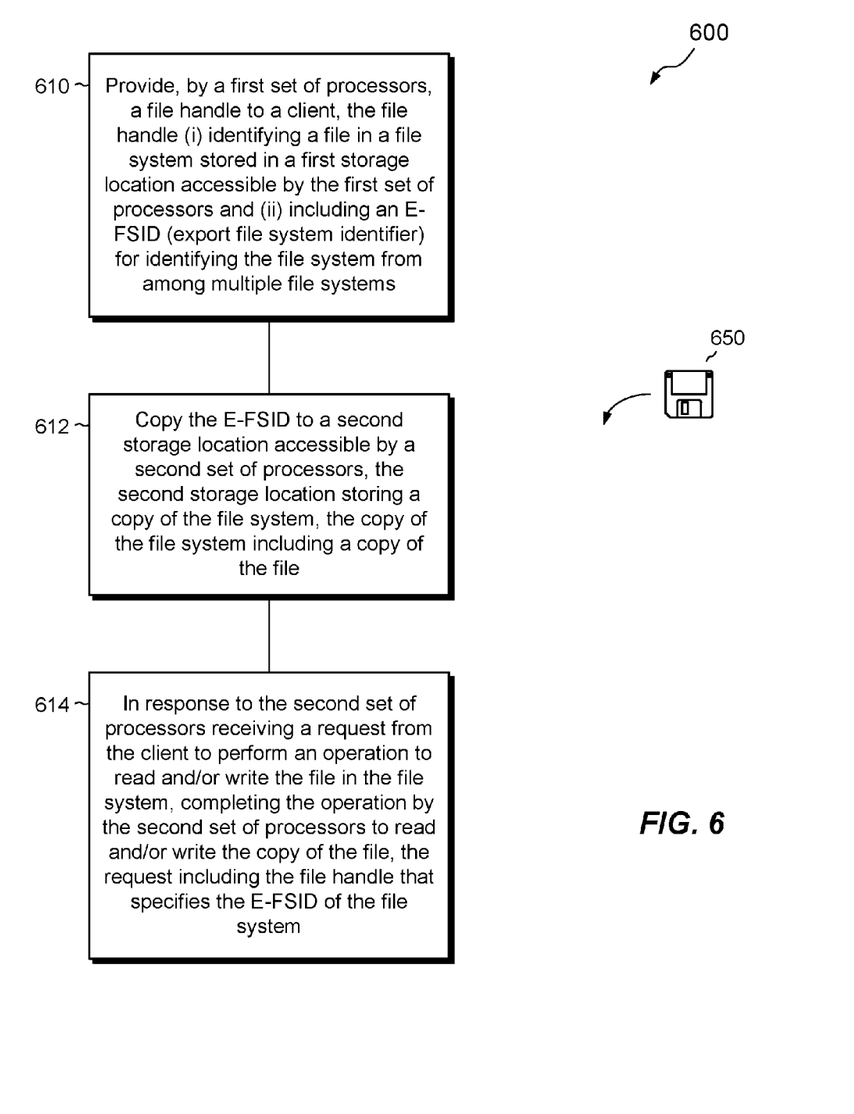
FIG. 6 is a flowchart showing an example process for managing access to files by different processors.

FIG. 6 shows a process 600 that may be carried out in connection with the computing environment 100 and is typically performed by the software constructs, described in connection with FIGS. 1-5, which reside in the memory 130 of the first set of storage processors 120 and in the memory 170 of the second set of storage processors 160 and are run by respective processing units 124 and 164. The various acts of the process 600 may be ordered in any suitable way. Accordingly, embodiments may be constructed in which acts are performed in an order different from that illustrated, which may include performing some acts simultaneously, even though the acts are shown as sequential in the illustrated embodiments.

At step 410, a first set of processors provide a file handle to a client. The file handle (i) identifies a file in a file system stored in a first storage location accessible by the first set of processors and (ii) includes an E-FSID (export file system identifier) for identifying the file system from among multiple file systems. For example, one or more storage processors 120a and 120b provide a file handle 112 to the client machine 110(1). The file handle 112 identifies a file 142 (e.g., based on inode number 220) in a file system (e.g., 140) stored in a first storage location (e.g., memory 130) accessible by the processors 120a and/or 120b. The file handle 112 also includes an E-FSID (e.g., 210 of FIGS. 2 and 116). The E-FSID identifies the file system 140 from among multiple file systems.

At step 412, the E-FSID is copied to a second storage location accessible by a second set of processors. The second storage location stores a copy of the file system, and the copy of the file system includes a copy of the file. For example, the storage processors 120a and/or 120b in the first data storage system 120 copies the E-FSID 116 to the second data storage system 160, where it is stored somewhere in its memory 170, e.g., in the database 174a. The memory 170 also stores a copy 140C of the file system 140. The copy 140C includes a copy 142C of the file 142.

At step 414, in response to the second set of processors receiving a request from the client to perform an operation to read and/or write the file in the file system, the second set of processors complete the operation to read and/or write the copy of the file. The request includes the file handle that specifies the E-FSID of the file system. For example, in response to any of the storage processors 160a and/or 160b (FIG. 1) in the second data storage system 160 receiving the request 114 to read and/or write the file 142 in the file system 140, the processors 160a and/or 160b complete the operation on the copy 142C of the file. As shown in FIG. 1, the request 114 includes the file handle 112 that specifies the E-FSID 116 of the file system 140.

An improved technique has been described for managing access to files by different data storage systems. The technique includes a data storage system 120 generating an E-FSID (export FSID) (e.g., 116) for a file system 140 in addition to a conventional FSID and providing the E-FSID 116 in file handles (e.g., 112) that the data storage system 120 generates for providing clients, e.g., 110(1) to 110(N), with access to the file system 140. The E-FSID 116 is shared between/among different data storage systems (e.g., between 120 and 160), with each data storage system including data (e.g., database 134a or 174a) for cross-referencing the E-FSID 116 to a respective local FSID for the file system. Because the E-FSID for a file is the same across different data storage systems, file handles continue to work after failover, migration, and other transitions. When a data storage system receives a file handle from a client, the data storage system performs a lookup to map the E-FSID received in the file handle to a respective local FSID, and then uses the local FSID to locate the file in storage. File handles are therefore preserved and survive failover and migration events. Inconvenience and disruption to clients are thus minimized or avoided altogether.

Having described certain embodiments, numerous alternative embodiments or variations can be made. For example, the improvement or portions thereof may be embodied as a computer program product including one or more non-transient, computer-readable storage media, such as one or more magnetic disks, magnetic tapes, compact disks, DVDs, optical disks, flash memories, Application Specific Integrated Circuits (ASICs), Field Programmable Gate Arrays (FPGAs), and the like (shown by way of example as medium 650 in FIG. 6). Multiple computer-readable media may be used. The medium (or media) may be encoded with instructions which, when executed on one or more computers or other processors, perform methods that implement the various processes described herein. Such medium (or media) may be considered an article of manufacture or a machine, and may be transportable from one machine to another.

Further, although features are shown and described with reference to particular embodiments hereof, such features may be included and hereby are included in any of the disclosed embodiments and their variants. Thus, it is understood that features disclosed in connection with any embodiment are included as variants of any other embodiment.

As used throughout this document, the words "comprising," "including," and "having" are intended to set forth certain items, steps, elements, or aspects of something in an open-ended fashion. Also, as used herein and unless a specific statement is made to the contrary, the word "set" means one or more of something. This is the case regardless of whether the phrase "set of" is followed by a singular or plural object and regardless of whether it is conjugated with a singular or plural verb. Although certain embodiments are disclosed herein, it is understood that these are provided by way of example only and the invention is not limited to these particular embodiments.

Those skilled in the art will therefore understand that various changes in form and detail may be made to the embodiments disclosed herein without departing from the scope of the invention.

What is claimed is:

1. A method of managing access to files by different processors, the method comprising:

providing, by a first set of processors, a file handle to a client, the file handle (i) identifying a file in a file system stored in a first storage location accessible by the first set of processors and (ii) including an E-FSID (export file system identifier) for identifying the file system from among multiple file systems;

copying the E-FSID to a second storage location accessible by a second set of processors, the second storage location storing a copy of the file system, the copy of the file system including a copy of the file; and in response to the second set of processors receiving a request from the client to perform an operation to read and/or write the file in the file system, the request including the file handle that specifies the E-FSID of the file system, the second set of processors completing the operation to read and/or write the copy of the file.

2. A method as in claim 1, further comprising, after providing the file handle to the client but prior to the second set of processors receiving the request:

receiving, by the first set of processors, a prior request from the client to perform a prior operation to read and/or write the file, the prior request including the file handle that specifies the E-FSID of the file system; and in response to receiving the prior request, performing the prior operation to read and/or write the file by the first set of processors.

3. A method as in claim 2, wherein performing the prior operation includes performing a lookup by the first set of processors to map the E-FSID received from the client in the file handle to an FSID (file system identifier) for the file system, the FSID for the file system being different from the E-FSID for the file system, and accessing the file system from the first storage location using the FSID of the file system.

4. A method as in claim 3, further comprising:
running a VSP (virtualized storage processor) on the first set of processors, the VSP having a network server and an IP (Internet protocol) address and providing a construct through which a set of clients can access a set of file systems, including the file system, from the first storage location; and
creating a copy of the VSP at the second storage location, the copy of the VSP having a network server and the same IP address as the VSP and providing a construct through which the set of clients can access copies of the set of file systems, including the file system, from the second storage location.

5. A method as in claim 4, wherein creating the copy of the VSP is performed as part of a replication process for replicating the VSP to the second storage location, and wherein performing the replication process includes:
creating a copy of each of the set of file systems in the second storage location; and
for each copy of the set of file systems stored in the second storage location, (i) creating a local FSID, the local FSID used locally by the second set of processors for reading and writing the respective file system copy, and (ii) storing a foreign E-FSID in connection with the local FSID, the foreign E-FSID being a copy of an E-FSID created for the same file system by the first set processors.

6. A method as in claim 5, wherein performing the replication process further includes, in response to the first set of processors taking a snap of a file system, replicating the snap to the second storage location, and wherein the method further comprises:
creating, by the first set of processors, an FSID for the snap and a separate E-FSID for the snap;
creating, by the second set of processors, a local FSID for the snap and a separate foreign E-FSID for the snap; and
storing, by the second set of processors, a foreign E-FSID for the snap in the second storage location in connection with the local FSID for the snap.

7. A method as in claim 5,
wherein performing the replication process further includes, by the second set of processors, generating a local E-FSID for each copy of the set of file systems and storing the local E-FSID in the second storage location in connection with the local FSID, each local E-FSID being different from a respective foreign E-FSID created for the same file system by the first set processors, and
wherein the method further comprises:
receiving, by the second set of processors, a read request to read the copy of the file of the file system, the read request including a second file handle that specifies the local E-FSID of the copy of the file system stored in the second storage location; and
in response to receiving the read request, the second set of processors (i) performing a lookup to map the local E-FSID received in the second file handle to the local FSID for the copy of the file system stored in the second location, and (ii) completing the read operation on the copy of the file of the file system in the second storage location using the local FSID of the copy of the file system.

8. A method as in claim 7, further comprising:
prior to receiving the read request, mounting the copy of the file system stored in the second storage location as read only; and
in response to a failure event at the first set of processors:
remounting the copy of the file system stored in the second storage location as read/write;
receiving, by the second set of processors, another request from the client to perform another read and/or write operation on the file, the other request including the file handle, the file handle including the E-FSID of the file, the E-FSID of the file matching the foreign E-FSID of the copy of the file system stored in the second storage location;
performing, by the second set of processors, a lookup to map the E-FSID received in the file handle to the local FSID of the copy of the file system stored in the second storage location; and
completing, by the second set of processors, the other read and/or write operation on the copy of the file stored in the second storage location.

9. A method as in claim 8, wherein each E-FSID is a randomly generated, 128-bit number.

10. A system for managing access to files by different processors, comprising:
a first set of processors; and
a second set of processors coupled to the first set of processors,
wherein the first set of processors is constructed and arranged to:
provide a file handle to a client, the file handle (i) identifying a file in a file system stored in a first storage location accessible by the first set of processors and (ii) including an E-FSID (export file system identifier) for identifying the file system from among multiple file systems; and
copy the E-FSID to a second storage location accessible by the second set of processors, the second storage location storing a copy of the file system, the copy of the file system including a copy of the file,
wherein the second set of processors is constructed and arranged to, in response to receiving a request from the client to perform an operation to read and/or write the file in the file system, complete the operation to read and/or write the copy of the file, and
wherein the request includes the file handle that specifies the E-FSID of the file system.

11. A computer program product including a set of non-transitory computer readable media storing instructions which, when executed by a first set of processors and a second set of processors, cause the first set of processors and the second set of processors to perform a method of managing access to files by different processors, the method comprising:
providing, by the first set of processors, a file handle to a client, the file handle (i) identifying a file in a file system stored in a first storage location accessible by the first set of processors and (ii) including an E-FSID (export file system identifier) for identifying the file system from among multiple file systems;
copying the E-FSID to a second storage location accessible by the second set of processors, the second storage location storing a copy of the file system, the copy of the file system including a copy of the file; and in response to the second set of processors receiving a request from the client to perform an operation to read and/or write the file in the file system, the request including the file handle that specifies the E-FSID of the file system, the second set of processors completing the operation to read and/or write the copy of the file.

12. A computer program product as in claim 11, wherein the method further comprising, after providing the file handle to the client but prior to the second set of processors receiving the request:
  receiving, by the first set of processors, a prior request from the client to perform a prior operation to read and/or write the file, the prior request including the file handle that specifies the E-FSID of the file system; and
  in response to receiving the prior request, performing the prior operation to read and/or write the file by the first set of processors.

13. A computer program product as in claim 12, wherein performing the prior operation includes performing a lookup by the first set of processors to map the E-FSID received from the client in the file handle to an FSID (file system identifier) for the file system, the FSID for the file system being different from the E-FSID for the file system, and accessing the file system from the first storage location using the FSID of the file system.

14. A computer program product as in claim 13, wherein the method further comprises:
  running a VSP (virtualized storage processor) on the first set of processors, the VSP having a network server and an IP (Internet protocol) address and providing a construct through which a set of clients can access a set of file systems, including the file system, from the first storage location; and
  creating a copy of the VSP at the second storage location, the copy of the VSP having a network server and the same IP address as the VSP and providing a construct through which the set of clients can access copies of the set of file systems, including the file system, from the second storage location.

15. A computer program product as in claim 14, wherein creating the copy of the VSP is performed as part of a replication process for replicating the VSP to the second storage location, and wherein performing the replication process includes:
  creating a copy of each of the set of file systems in the second storage location; and
  for each copy of the set of file systems stored in the second storage location, (i) creating a local FSID, the local FSID used locally by the second set of processors for reading and writing the respective file system copy, and (ii) storing a foreign E-FSID in connection with the local FSID, the foreign E-FSID being a copy of an E-FSID created for the same file system by the first set processors.

16. A computer program product as in claim 15, wherein performing the replication process further includes, in response to the first set of processors taking a snap of a file system, replicating the snap to the second storage location, and wherein the method further comprises:
  creating, by the first set of processors, an FSID for the snap and a separate E-FSID for the snap;
  creating, by the second set of processors, a local FSID for the snap and a separate foreign E-FSID for the snap; and
  storing, by the second set of processors, a foreign E-FSID for the snap in the second storage location in connection with the local FSID for the snap.

17. A computer program product method as in claim 15, wherein performing the replication process further includes, by the second set of processors, generating a local E-FSID for each copy of the set of file systems and storing the local E-FSID in the second storage location in connection with the local FSID, each local E-FSID being different from a respective foreign E-FSID created for the same file system by the first set processors, and wherein the method further comprises:
  receiving, by the second set of processors, a read request to read the copy of the file of the file system, the read request including a second file handle that specifies the local E-FSID of the copy of the file system stored in the second storage location; and
  in response to receiving the read request, the second set of processors (i) performing a lookup to map the local E-FSID received in the second file handle to the local FSID for the copy of the file system stored in the second location, and (ii) completing the read operation on the copy of the file of the file system in the second storage location using the local FSID of the copy of the file system.

18. A computer program product as in claim 17, wherein the method further comprises:
  prior to receiving the read request, mounting the copy of the file system stored in the second storage location as read only; and
  in response to a failure event at the first set of processors:
    remounting the copy of the file system stored in the second storage location as read/write;
    receiving, by the second set of processors, another request from the client to perform another read and/or write operation on the file, the other request including the file handle, the file handle including the E-FSID of the file, the E-FSID of the file matching the foreign E-FSID of the copy of the file system stored in the second storage location;
    performing, by the second set of processors, a lookup to map the E-FSID received in the file handle to the local FSID of the copy of the file system stored in the second storage location; and
    completing, by the second set of processors, the other read and/or write operation on the copy of the file stored in the second storage location.

19. A computer program product as in claim 18, wherein each E-FSID is a randomly generated, 128-bit number.

20. A computer program product as in claim 11, wherein the method further comprises, prior to receiving the request from the client and in response to a failure event in the first set of processors, failing over access to the file from the first set of processors to the second set of processors, wherein the second set of processors continues to provide access to the file by the client using the file handle.

* * * * *